United States Patent
Pai et al.

(10) Patent No.: US 11,824,972 B2
(45) Date of Patent: Nov. 21, 2023

(54) METHOD AND SYSTEM FOR ONBOARDING CLIENT DEVICES TO A KEY MANAGEMENT SERVER

(71) Applicant: MOTOROLA SOLUTIONS, INC., Chicago, IL (US)

(72) Inventors: Madhusudan Pai, Frisco, TX (US); Rajendra Anthony, Richardson, TX (US); Bharatram Setti, Plano, TX (US); Ramu Kandula, McKinney, TX (US)

(73) Assignee: MOTOROLA SOLUTIONS, INC., Chicago, IL (US)

( * ) Notice: Subject to any disclaimer, the term of this patent is extended or adjusted under 35 U.S.C. 154(b) by 294 days.

(21) Appl. No.: 17/450,891

(22) Filed: Oct. 14, 2021

(65) Prior Publication Data
US 2023/0122665 A1 Apr. 20, 2023

(51) Int. Cl.
*H04L 29/06* (2006.01)
*H04L 9/08* (2006.01)
(Continued)

(52) U.S. Cl.
CPC .......... *H04L 9/0825* (2013.01); *G06F 21/575* (2013.01); *H04L 9/3073* (2013.01);
(Continued)

(58) Field of Classification Search
CPC ... H04L 9/0825; H04L 9/3073; H04L 9/3213; H04L 9/3268; G06F 21/575; G06F 2221/034
See application file for complete search history.

(56) References Cited

U.S. PATENT DOCUMENTS

| | | | |
|---|---|---|---|
| 10,063,991 B2 * | 8/2018 | Alnas | H04W 4/50 |
| 2014/0189834 A1 | 7/2014 | Metke et al. | |

(Continued)

FOREIGN PATENT DOCUMENTS

| | | | | |
|---|---|---|---|---|
| WO | WO-2018203512 A1 * | 11/2018 | ........... | B62B 5/0096 |
| WO | WO-2019015382 A1 * | 1/2019 | ............. | H04L 61/30 |
| WO | WO-2020069753 A1 * | 4/2020 | ........... | G06F 9/4416 |

OTHER PUBLICATIONS

J. L. C. Hoffmann, L. P. Horstmann and A. Augusto Fröhlich, "A PUF-based Secure Bootstrap Protocol for Cyber-Physical System Networks," 2022 IEEE 20th International Conference on Industrial Informatics (INDIN), Perth, Australia, 2022, pp. 202-207, doi: 10.1109/INDIN51773.2022.9976134. (Year: 2022).*

*Primary Examiner* — Shawnchoy Rahman
(74) *Attorney, Agent, or Firm* — Raguraman Kumaresan (57) ABSTRACT

A system and process for onboarding client devices to a key management server. In operation, a device generates an asymmetric key pair including a public key and a private key. The device obtains an access token from an identity management server after successfully authenticating with the identity management server. The device transmits a request including the access token and the public key to the key management server to onboard the client device. The device receives a response including encrypted bootstrap information from the key management server. The bootstrap information included in the response is encrypted using the public key of the asymmetric key pair. The device decrypts the encrypted bootstrap information using the private key of the asymmetric key pair to obtain the bootstrap information and then uses the bootstrap information for encrypting communications transmitted to the key management server or for decrypting communications received from the key management server.

20 Claims, 4 Drawing Sheets

(51) Int. Cl.
  *H04L 9/30* (2006.01)
  *G06F 21/57* (2013.01)
  *H04L 9/32* (2006.01)

(52) U.S. Cl.
  CPC .......... *H04L 9/3213* (2013.01); *H04L 9/3268* (2013.01); *G06F 2221/034* (2013.01)

(56) References Cited

U.S. PATENT DOCUMENTS

2015/0378714 A1* 12/2015 Katariya ................. H04L 67/34
  717/170
2016/0359844 A1* 12/2016 Saboori ................. H04L 63/102
2019/0028459 A1    1/2019  Fries et al.

\* cited by examiner

METHOD AND SYSTEM FOR ONBOARDING CLIENT DEVICES TO A KEY MANAGEMENT SERVER

BACKGROUND

Securing voice and data communications is a concern to many businesses, governments, institutions, and individuals. Securing communications between two parties typically requires parties to onboard their devices to a key management infrastructure for provisioning the devices with bootstrap information for obtaining further security elements needed for secure communications. Currently onboarding a device to a key management infrastructure requires staging the device by connecting it physically to a key delivery device such as a key variable loader (KVL) or a key fill device (KFD) which will then push the initial set of keys into the device. The device will then use the initial set of keys obtained from the key delivery device to communicate over-the-air with the key management infrastructure and derive additional keys for communicating with other devices. However, staging is not scalable for onboarding purposes as it requires manual intervention by the administrator of the key management infrastructure as well as the physical presence of the devices.

BRIEF DESCRIPTION OF THE SEVERAL VIEWS OF THE DRAWINGS

In the accompanying figures similar or the same reference numerals may be repeated to indicate corresponding or analogous elements. These figures, together with the detailed description, below are incorporated in and form part of the specification and serve to further illustrate various embodiments of concepts that include the claimed invention, and to explain various principles and advantages of those embodiments.

Skilled artisans will appreciate that elements in the figures are illustrated for simplicity and clarity and have not necessarily been drawn to scale. For example, the dimensions of some of the elements in the figures may be exaggerated relative to other elements to help improve understanding of embodiments of the present disclosure.

The apparatus and method components have been represented where appropriate by conventional symbols in the drawings, showing only those specific details that are pertinent to understanding the embodiments of the present disclosure so as not to obscure the disclosure with details that will be readily apparent to those of ordinary skill in the art having the benefit of the description herein.

DETAILED DESCRIPTION OF THE INVENTION

As described above, securing communications requires the communicating parties to onboard their client devices to a key management infrastructure (also referred to as a key management server). During onboarding, a key management server establishes an initial security or trust relation with a previously unknown client device or user and then uploads bootstrap information or an initial cryptographic seed (e.g., a symmetric transport key) to the client device. The 3GPP technical specification (TS) 33.180 produced by European Telecommunications Standards Institute (ETSI), for example, defines security architecture, procedures, and information flows needed to protect a mission critical service (MCX), but the 3GPP technical specification does not define how bootstrap information is distributed to mission critical (MC) client devices. The 3GPP technical specification 33.180 only mentions that a bootstrap transport key or TrK is distributed via an out-of-band mechanism or that the MC client devices are provisioned through some offline methods.

Disclosed is a new process of onboarding client devices to a key management server. The process described below can be implemented in communication systems to automatically provision bootstrap information securely over-the-air into the client devices while eliminating the need to physically stage a client device with a key delivery device such as key variable loader or a key fill device.

One embodiment provides a method for onboarding client devices to a key management server. The method comprises: generating, at a client device, an asymmetric key pair including a public key and a private key; obtaining, at the client device, an access token from an identity management server after successfully authenticating the client device or a user with the identity management server; transmitting, at the client device, a request to the key management server to onboard the client device to the key management server, the request including the access token and the public key of the asymmetric key pair; receiving, at the client device, a response including encrypted bootstrap information from the key management server, the encrypted bootstrap information including bootstrap information assigned corresponding to an identity of the client device or an identity of the user, the bootstrap information encrypted using the public key of the asymmetric key pair; decrypting, at the client device, the encrypted bootstrap information using the private key of the asymmetric key pair to obtain the bootstrap information; and using, at the client device, the bootstrap information for encrypting communications transmitted to the key management server or for decrypting communications received from the key management server.

A second embodiment provides a method for onboarding client devices to a key management server. The method comprises: receiving, at the key management server, a first request from a first client device to onboard the first client device to the key management server, the first request including an access token obtained by the first client device after successfully authenticating with an identity management server, the first request further including a public key of an asymmetric key pair generated at the first client device; validating, at the key management server, the access token received from the first client device; encrypting, at the key management server, first bootstrap information assigned corresponding to an identity of the first client device or an identity of a first user using the public key received from the first client device to generate first encrypted bootstrap information; transmitting, at the key management server, a first response including the first encrypted bootstrap information to the first client device; and using, at the key management server, the bootstrap information for encrypting communications transmitted to the first client device or for decrypting communications received from the first client device.

A third embodiment provides a system comprising a client device; a key management server; and a communication network configured to establish communication between the client device and the key management server. The client device is configured to generate an asymmetric key pair including a public key and a private key, obtain an access token from an identity management server after successfully authenticating the client device or a user with the identity management server, and transmit a request to the key management server to onboard the client device to the key management server, the request including the access token and the public key of the asymmetric key pair. The key management server is configured to validate the access token included in the request received from the client device, encrypt bootstrap information assigned corresponding to an identity of the client device or an identity of a first user using the public key received from the client device to generate encrypted bootstrap information, and transmit a response including the encrypted bootstrap information to the client device. The client device is further configured to receive the response from the key management server, decrypt the encrypted bootstrap information using the private key of the asymmetric key pair to obtain the bootstrap information, and use the bootstrap information for encrypting communications transmitted to the key management server or for decrypting communications received from the key management server.

Each of the above-mentioned embodiments will be discussed in more detail below, starting with example system and device architectures of the system in which the embodiments may be practiced, followed by an illustration of processing blocks for achieving an improved technical method, device, and system for onboarding client devices to a key management server. Example embodiments are herein described with reference to flowchart illustrations and/or block diagrams of methods, apparatus (systems) and computer program products according to example embodiments. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. The methods and processes set forth herein need not, in some embodiments, be performed in the exact sequence as shown and likewise various blocks may be performed in parallel rather than in sequence. Accordingly, the elements of methods and processes are referred to herein as "blocks" rather than "steps."

These computer program instructions may also be stored in a computer-readable memory that can direct a computer or other programmable data processing apparatus to function in a particular manner, such that the instructions stored in the computer-readable memory produce an article of manufacture including instructions which implement the function/act specified in the flowchart and/or block diagram block or blocks.

The computer program instructions may also be loaded onto a computer or other programmable data processing apparatus to cause a series of operational blocks to be performed on the computer or other programmable apparatus to produce a computer implemented process such that the instructions which execute on the computer or other programmable apparatus provide blocks for implementing the functions/acts specified in the flowchart and/or block diagram block or blocks. It is contemplated that any part of any aspect or embodiment discussed in this specification can be implemented or combined with any part of any other aspect or embodiment discussed in this specification.

Further advantages and features consistent with this disclosure will be set forth in the following detailed description, with reference to the figures.

Figure 1:
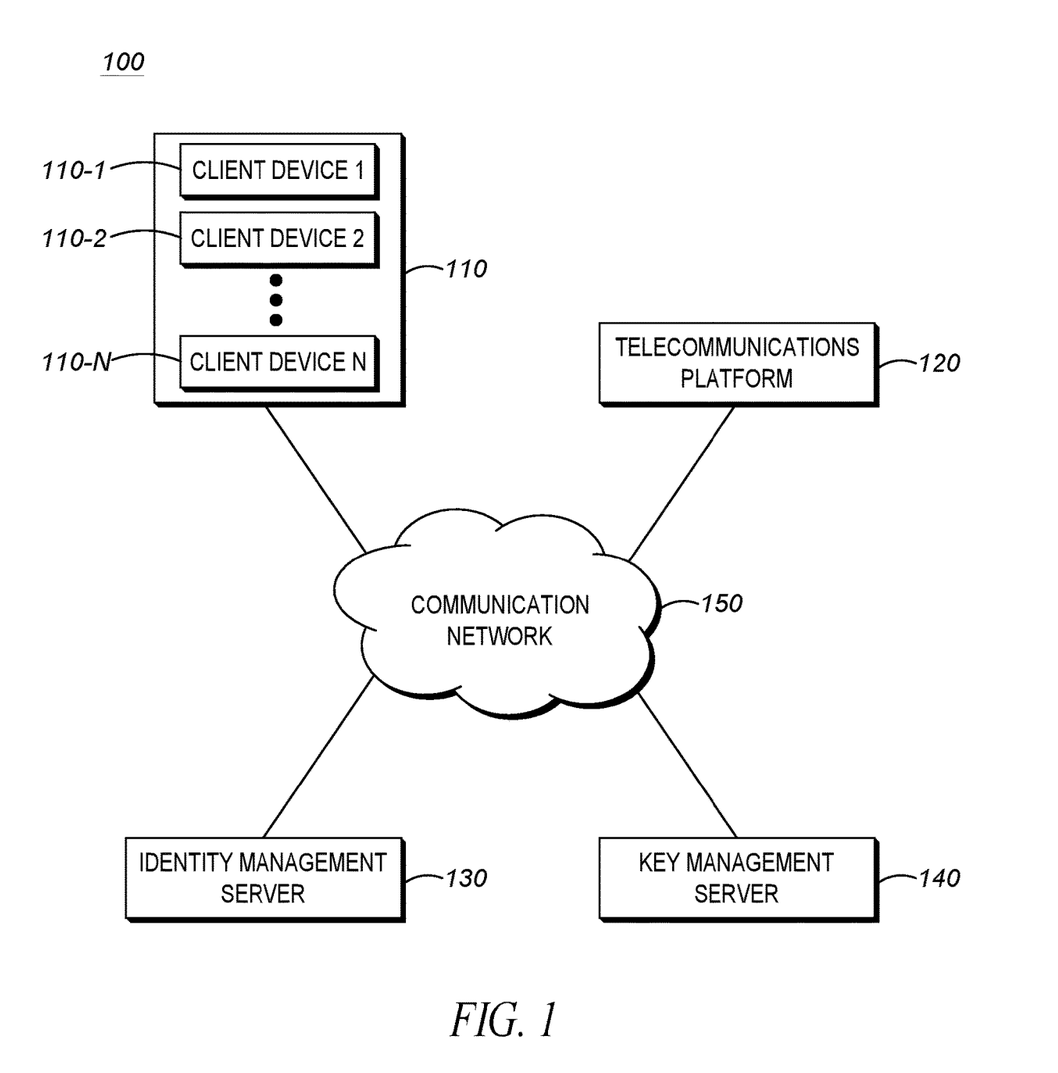
FIG. 1 is a block diagram of a system in accordance with some embodiments.

Referring now to the drawings, and in particular FIG. 1, a communications system 100 is shown including a plurality of client devices 110-1, 110-2 . . . 110-n, a telecommunications platform 120, an identity management server (IdMS) 130, a key management server (KMS) 140, and a communication network 150. The client devices 110-1 through 110-N can be interchangeably referred to, collectively, as client devices 110 and generically as a client device 110. As referred to herein, the client devices 110 include, but are not limited to, devices commonly referred to as access terminals, mobile radios, mobile stations, subscriber units, user equipment (UE), mobile devices, or any other device capable of operating in a wireless or wireline environment. Examples of client devices 110 include, but are not limited to, two-way radios (e.g., land mobile radio or LMR), mobile phones, cellular phones, smart phones, tablets, Personal Digital Assistants (PDAs), mobile data terminals (MDT), laptops and two-way pagers. In one embodiment, the client device 110 may include fixed communication equipment. The client device 110 may also be a device maintained, for example, at a call center or public safety command center (e.g., a desktop computer). User applications (also referred to as "clients") reside on client devices 110 for accessing various communication services provided by the telecommunications platform 120. An example of a user application is a client-side push-to-talk (PTT) call application that provides instantaneous private and group communication at the push of a software interface or a hardware interface implemented at the client device 110.

In accordance with embodiments, the telecommunications platform 120 may provide one or more of the following communication services to client devices 110: PTT call sessions (e.g., providing two-way half-duplex voice calls within a group of client devices 110), transmitting/receiving text messages, transmitting/receiving multimedia messages, transmitting/receiving data files, transmitting/receiving location information of client devices 110, transmitting/receiving video and/or data (e.g., including voice messages and/or voice mail), combinations thereof, or the like. In accordance with some embodiments, the communications system 100 provides security architecture for supporting mission critical services for use by public-safety (e.g., police, fire, and rescue agencies) and commercial organizations (e.g., utility and transportation companies) in accordance with the 3GPP standard. In these embodiments, the telecommunications platform 120 provides mission critical services to client devices 110 including one or more of mission critical push-to-talk (MCPTT) services, mission critical video (MCVideo) services, and mission critical data (MCData) services. In one embodiment, the telecommunications platform 120 is a PTT-over-cellular (POC) platform in which subscribers to PTT solutions (e.g., users operating PTT clients on clients devices 110) may be provisioned onto the communications system 100 via interfaces to carriers (e.g., cellular carriers). PTT customers (e.g., enterprises or public-safety agencies) may administer these subscribers to form closed groups for PTT communications. The telecommunications platform 120 may use fully virtualized components with a layered approach to service orchestration, which allows the telecommunications platform 120 to be integrated into various cloud environments, such as a carrier's private cloud infrastructure, a dedicated PTT cloud infrastructure, combinations thereof, and the like. In accordance with embodiments, the telecommunications platform 120 may include multiple servers (e.g. MCPTT server, MCVideo server, MCData server) each supporting a different service. Although the identity management server 130 and key management server 140 are shown as separate entities in FIG. 1, in some embodiments, the identity management server 130 and key management server 140 may be integrated into the telecommunications platform 120 to provide one or more of identity authentication, authorization, onboarding, and key management services to client devices 110.

The identity management server 130 is any computing device that is configured to authenticate an identity of the client device 110 or an identity of a user operating the client device 110 and to provide an access token to the client device 110 via the communication network 150. In accordance with embodiments, the client device 110 uses the access token to access the onboarding and key management services provided by the key management server 140. The client device 110 may also additionally use the access token to access, for example, mission critical services provided by one or more servers included in the telecommunications platform 120.

The key management server 140 is an infrastructure endpoint computer that is configured to provide over-the-air onboarding and key management services for the client devices 110. In accordance with embodiments, the key management server 140 is configured to onboard the client device 110 by validating the access token obtained by the client device 110 from the identity management server 130 and providing bootstrap information assigned corresponding to an identity of the client device 110 or an identity of a user operating the client device 110. In accordance with embodiments, the bootstrap information is encrypted by the key management server 140 using a public key of an asymmetric key pair generated by the client device 110 and shared with the key management server 140.

The client device 110 communicates with the telecommunications platform 120, identity management server 130, and key management server 140 over the communication network 150. The communication network 150 may be accessed by the client devices 110 through a cellular network deployed by a carrier, a WiFi network, a radio access network (RAN), other wireless networks, a wired internet protocol (IP) network, combinations thereof, or the like. The communication network 150 may include one or more components configured to provide wireless or wired network access, such as an enhanced base station (eNB), a macrocell, a femtocell, a Wi-Fi access point (AP), combinations thereof, or the like. Furthermore, the communication network 150 may operate in accordance with one or more wireless communication protocols, e.g., open mobile alliance (OMA), long term evolution (LTE), LTE advanced (LTE-A), High Speed Packet Access (HSPA), Wi-Fi 802.11a/b/g/n/ac, 3GPP, 3GPP MCPTT, etc. In some embodiments, the communication network 150 may comprise various other devices, such as relays, low power nodes, etc. The communication network 150 may further include backhaul network components, such as various gateways, routers, controllers, schedulers, and the like.

While FIG. 1 illustrates one example embodiment of the system 100, in other embodiments, the system 100 may include more or fewer components and may perform functions that are not explicitly described herein. For example, the system 100 may include additional client devices, identity management servers, key management servers and telecommunications platforms. Further, in some embodiments, one or more entities of the system 100 are combined into a single device. For example, the identity management 130 and key management server 140 may be combined into a single infrastructure that performs the functions of both entities that are described herein.

Figure 2:
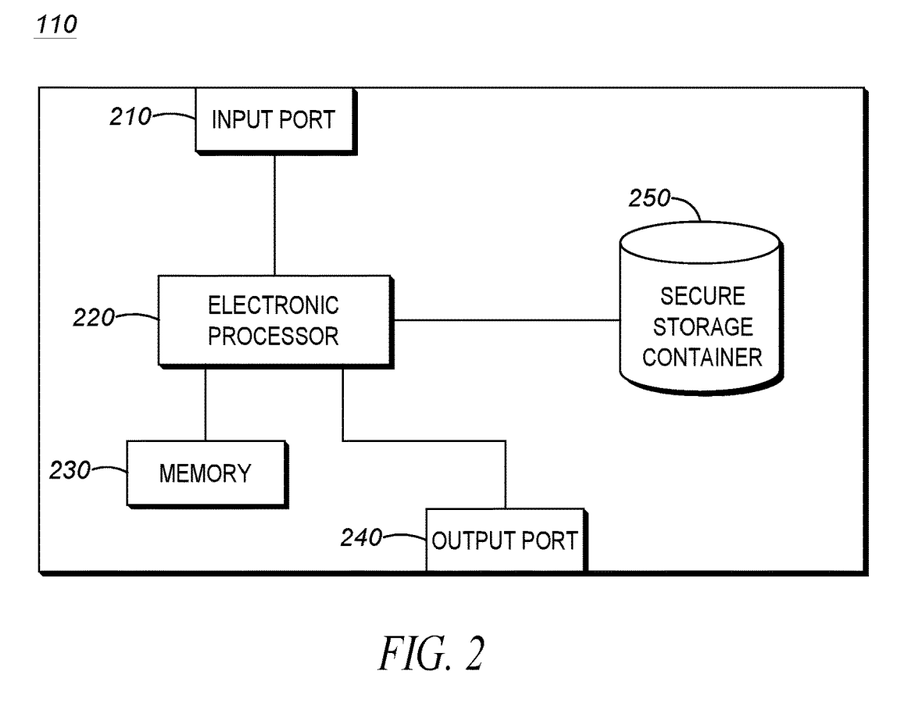
FIG. 2 is a block diagram of a client device shown in FIG. 1 in accordance with some embodiments.

FIG. 2 is an example functional block diagram of a client device 110 in accordance with some embodiments. In the embodiment shown in FIG. 2, the client device 110 includes an input port 210, an electronic processor 220, a memory 230, an output port 240, and a secure storage container 250. Depending on the type of client device 110, the client device 110 may include fewer or additional components in configurations different from that illustrated in FIG. 2. The input port 210 and electronic processor 220 communicate over one or more communication lines or buses. Similarly, the electronic processor 220 and output port 240 communicate over one or more communication lines or buses. Wireless connections or a combination of wired and wireless connections are also possible. The input port 210 receives electronic signals from the telecommunications platform 120, identity management server 130, and key management server 140. The input port 210 is electrically connected to the electronic processor 220. The output port 240 transmits signals to the telecommunications platform 120, identity management server 130, and key management server 140. The output port 240 is electrically coupled to the electronic processor 220. Although depicted in FIG. 2 as two separate elements, input port 210 and output port 240 can be a single element, such as a transceiver that could be an LTE modem, an FM transceiver, or a Wi-Fi or Ethernet transceiver.

The electronic processor 220 may include one or more of a microprocessor, application-specific integrated circuit (ASIC), field-programmable gate array, or another suitable electronic device. In accordance with some embodiments, the electronic processor 220 includes a baseband processor and an application processor. The electronic processor 220 obtains and provides information (for example, from memory 230 and/or input port 210), and processes the information by executing one or more software instructions or modules, capable of being stored, for example, in a random access memory ("RAM") area of memory 230 or a read only memory ("ROM") of memory 230 or another non-transitory computer readable medium (not shown). The software can include firmware, one or more applications, program data, filters, rules, one or more program modules, and other executable instructions. The electronic processor 220 is configured to retrieve from memory 230 and execute, among other things, software related to the control processes and methods described herein.

The memory 230 can include one or more non-transitory computer-readable media, and may include a program storage area and a data storage area. The program storage area and the data storage area can include combinations of different types of memory, as described herein. In the embodiment illustrated, the memory 230 stores, among other things, instructions for the electronic processor 220 to carry out any methods (e.g., process 400 shown in FIG. 4) included herein.

In accordance with some embodiments, the client device 110 further includes a secure storage container 250 that provides encryption, decryption, signing, and verification functions associated with the use of bootstrap information obtained from the key management server 140 during the process of onboarding the client device 110 to the key management server 140. In accordance with embodiments, the bootstrap information obtained from the key management server 140 during the onboarding process is securely stored within the secure storage container 250. Further, the security storage container 250 is the only entity where bootstrap information is accessible on the client device 110. In accordance with some embodiments, the secure storage container 250 is configured with native key generation functions for generating and storing an asymmetric key pair (or multiple asymmetric key pairs) including a private key and a public key. In accordance with some embodiments, the secure storage container 250 may generate a separate asymmetric key pair each time the client device is to be onboarded (e.g., for different users) to the key management server. In some embodiments, the asymmetric key pair is protected against erasure and further remains intact for the lifetime of the client device 110. In other embodiments, the asymmetric key pair is automatically erased after user's session on the client device 110. In one embodiment, the secure storage container 250 is a hardware security module (HSM) which may reside on a second electronic processor separate from the electronic processor 220. In this embodiment, the security of contents (e.g., asymmetric key pair, bootstrap information etc.) stored at the HSM is guaranteed at a hardware level as operating system kernels, firmware, software applications, or other programs residing at the client device 110 will not have access to the information stored at the HSM. In another embodiment, the secure storage container is a protected key store (e.g., a Federal Information Processing Standard (FIPS) 140-2 key store) that resides within the memory 230 of the client device 110. The contents (e.g., asymmetric key pair, bootstrap information etc.) are imported into the protected key store of the client device 110 and further stored in an encrypted form in the protected key store.

Figure 3:
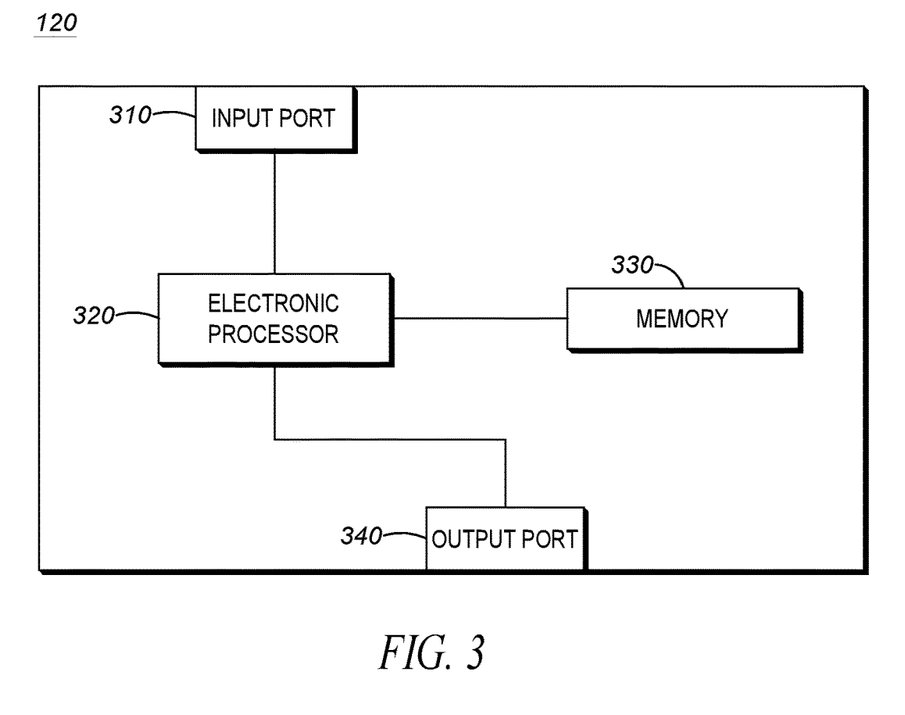
FIG. 3 is a block diagram of a key management server shown in FIG. 1 in accordance with some embodiments.

FIG. 3 schematically illustrates a key management server 140 in more detail. In the embodiment depicted in FIG. 3, the key management server 140 includes an input port 310, an electronic processor 320, a memory 330, and an output port 340. The input port 310 and electronic processor 320 communicate over one or more communication lines or buses. Similarly, the electronic processor 320 and output port 340 communicate over one or more communication lines or buses. Wireless connections or a combination of wired and wireless connections are also possible.

The input port 310 may receive electronic signals from one or more of the client devices 110, the telecommunications platform 120, and identity management server 130. The input port 310 is electrically connected to the electronic processor 320. The output port 340 may transmit signals to one or more of the client devices 110, the telecommunications platform 120, and identity management server 130. The output port 340 is electrically coupled to the electronic processor 320. Although depicted in FIG. 3 as two separate elements, input port 310 and output port 340 can be a single element, such as a transceiver that could be an LTE modem, an FM transceiver, or a Wi-Fi or Ethernet transceiver.

The electronic processor 320 may include a microprocessor, application-specific integrated circuit (ASIC), field-programmable gate array, or another suitable electronic device. The electronic processor 320 obtains and provides information (for example, from memory 330 and/or input port 310), and processes the information by executing one or more software instructions or modules, capable of being stored, for example, in a random access memory ("RAM") area of memory 330 or a read only memory ("ROM") of memory 330 or another non-transitory computer readable medium (not shown). The software can include firmware, one or more applications, program data, filters, rules, one or more program modules, and other executable instructions. The electronic processor 320 is configured to retrieve from memory 330 and execute, among other things, software related to the control processes and methods described herein.

The memory 330 can include one or more non-transitory computer-readable media, and may include a program storage area and a data storage area. The program storage area and the data storage area can include combinations of different types of memory, as described herein. In the embodiment illustrated, memory 330 stores, among other things, instructions for the electronic processor 320 to carry out any methods (e.g., process 500 shown in FIG. 5) included herein.

In accordance with embodiments, the memory 330 of the key management server 140 may store bootstrap information assigned corresponding to an identity of the client device 110 or an identity of the user. The memory 330 may also further store information regarding an expiration time indicating a time at which the bootstrap information assigned to a particular identity will no longer be valid. In one embodiment, the key management server 140 may similarly include a secure storage container (not shown) implemented using a hardware security module or a protected key store for randomly generating and assigning bootstrap information and other security elements required to perform onboarding and key management services for the client devices 110.

Figure 4:
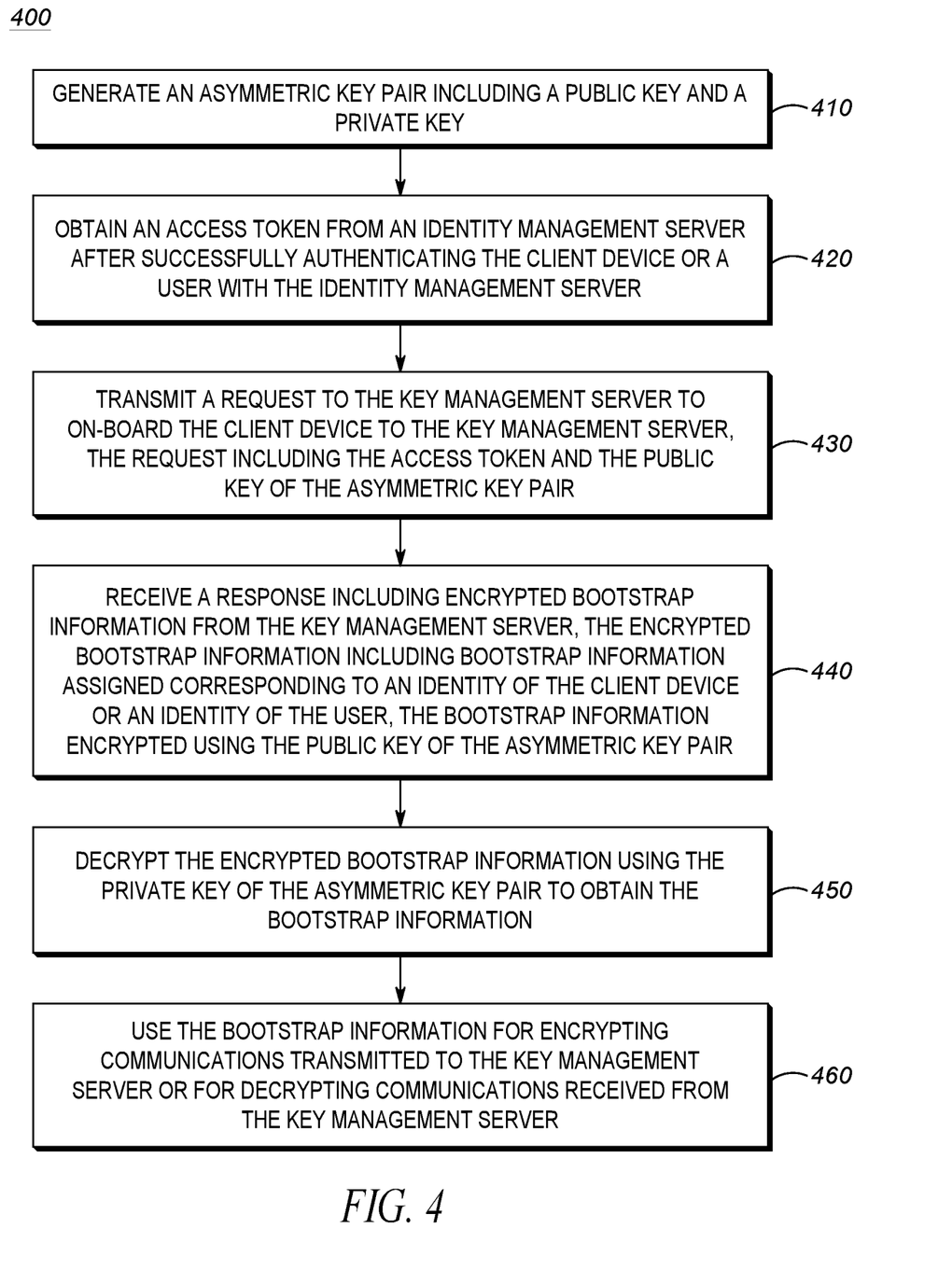
FIG. 4 illustrates a flow diagram of a process for onboarding client devices to a key management server in accordance with some embodiments.

Turning now to FIG. 4, a flowchart diagram illustrates a process 400 for onboarding client devices 110 to a key management server 140. While a particular order of processing steps, message receptions, and/or message transmissions is indicated in FIG. 4 as an example, timing and ordering of such steps, receptions, and transmissions may vary where appropriate without negating the purpose and advantages of the examples set forth in detail throughout the remainder of this disclosure. The process 400 of FIG. 4 is executed by the client device 110 (e.g., client device 110-1) and need not be performed in the exact sequence as shown and likewise various blocks may be performed in different order or alternatively in parallel rather than in sequence. The process 400 may be implemented on variations of the communications system 100 of FIG. 1 as well.

The process 400 may be executed by the client device 110 in response to a trigger that may be raised locally at the client device 110 in one or more of the following scenarios: (i) the client device 110 is powered-up for operation, for example, the first time after being shipped out of a factory to a customer site; (ii) the device or a client application is reset; (ii) the client device 110 switches to a new mode of operation or a client application is installed to access a new service; (iii) the client device 110 attempts to connect with a new KMF personality (e.g., when the client device 110 roams to a geographic area associated with a new KMF); (iv) the bootstrapping information already assigned corresponding to an identity of the client device 110 or an identity of the user expires; and (v) a user different from a previous user registers with the client device 110 or client application.

Other scenarios to execute the process 400 of onboarding a client device 110 to a key management server 140 exist as well.

At block 410, the client device 110 generates an asymmetric key pair including a public key and a private key. In accordance with some embodiments, the asymmetric key pair may be generated using native key store functions implemented within a secure storage container 250 of the client device 110. Accordingly, in these embodiments, the asymmetric key pair is stored within the secure storage container 250. In some embodiments, a new asymmetric key pair is generated each time a client device 110 is to be onboarded to a key management server 140.

At block 420, the client device 110 obtains an access token from an identity management server 130 after successfully authenticating the client device 110 or a user operating the client device 110 with the identity management server 130. In accordance with embodiments, the client device 110 may provide a set of credentials (e.g., a username/password combination, security token, biometric information, device certificate, etc.) to the identity management server 130 to authenticate itself or to authenticate a user operating the client device 110 to the identity management server 130. The user can input the set of credentials to the client device 110. Additionally, or alternatively, the set of credentials can be stored by the client device 110. In accordance with some embodiments, the connection between the client device 110 and the identity management server 130 may be protected using Hypertext Transfer Protocol (HTTP) over Transport Layer Security (TLS), which may also be referred to as Hypertext Transfer Protocol Secure (HTTPS). After receiving the credentials from the client device 110, the identity management server 130 can provide, to the client device 110, an access token representing one of (i) an authenticated identity of the client device 110 or (ii) an authenticated identity of the user operating the client device 110. The identity management server 130 can authenticate the credentials using a suitable data structure. For example, the identity management server 130 may perform a lookup of information related to the credentials obtained from the client device 110. When a result of the lookup indicates a match, the identity management server 130 determines that one or more of the credentials obtained from the client device 110 are authenticated and provides an access token to the client device 110. The access token may include information indicating one or more of: a unique identifier of the client device 110; a unique identifier of the user; a unique identifier of the identity management server 130 which issued the access token; an issue time indicating the time at which the access token was issued; an expiration time indicating a time at which the access token will expire; and an authentication method used to verify the identity of the client device 110 or the user. In accordance with some embodiments, an authentication framework defined in OpenID Connect (OIDC) protocol is used to authenticate the identity of the client device 110 or the user to the identity management server 130. In these embodiments, the identity management server 130 provides, to the client device 110, an OIDC access token representing an authenticated identity of the client device 110 or an authenticated identity of the user operating the client device 110. Other authentication protocols may also be used.

Next, at block 430, the client device 110 transmits a request to the key management server 140 to onboard the client device 110 to the key management server 140. The request further includes (i) the access token obtained from the identity management server 130 at block 420 and (ii) the public key of the asymmetric key pair generated at the client device 110 at block 410. In accordance with embodiments, the access token is transmitted in an application-level message along with the public key of the client device 110 to the key management server 140 via a UDP (user datagram protocol) connection or via a transport-layer security (TLS) connection which may traverse one or more TLS proxy nodes (e.g., F5 proxy). In one embodiment, the access token and the public key are included in a single message or the same message associated with the request to onboard the client device 110. In another embodiment, the client device 110 may send the access token and the public key in separate messages associated with the request to onboard the client device 110. For example, the request including the access token may be sent in the first message. The public key may be sent in a separate second message, for example, in response to receiving an acknowledgment from the key management server 140 indicating that the key management server 140 has validated the access token. In accordance with embodiments, the key management server 140 authenticates the user of the client device 110 using the access token independent of the client-server TLS connection or in other words the key management server 140 is agnostic to the transport-layer security connection through which the access token was transferred.

Next at block 440, the client device 110 receives a response including encrypted bootstrap information from the key management server 140. The encrypted bootstrap information includes bootstrap information assigned corresponding to an identity of the client device 110 or an identity of the user. In accordance with embodiments, the bootstrap information is encrypted by the key management server using the public key of the asymmetric key pair generated at block 410. As used herein, the term "bootstrap information" refers to an initial cryptographic seed or security context generated by the key management server 140 pursuant to establishing a trust relation with a previously unknown client device 110 or an unknown user. In accordance with embodiments, the bootstrap information includes one or more of a transport key (e.g., 3GPP bootstrap transport key or TrK), a certificate, a hardware security token, a near-field communication (NFC) token, or a biometric key. The bootstrap information assigned corresponding to an identity of the client device 110 may be different from bootstrap information assigned corresponding to an identity of the user. For example, when the access token included in the request corresponds to an identity of the client device 110, the bootstrap information is assigned corresponding to the identity of the client device 110. As another example, when the access token included in the request corresponds to an identity of the user, the bootstrap information is assigned corresponding to the identity of the user. When multiple users operate the same client device 110, bootstrap information assigned corresponding to each of the respective identities of the users is different.

At block 450, the client device 110 decrypts the encrypted bootstrap information using the private key of the asymmetric key pair to extract the bootstrap information. In accordance with some embodiments, the client device 110 securely stores the encrypted bootstrap information received at block 440 within the secure storage container 250 (e.g., an HSM or a protected key store) that provides a protected environment for decrypting the encrypted bootstrap information and subsequently performing cryptographic functions such as encryption, decryption, signing, and verification with the bootstrap information. In accordance with some embodiments, the bootstrap information is made available in a decrypted form only within the secure storage container 250 of the client device 110.

At block 460, the client device 110 uses the bootstrap information for encrypting communications transmitted to the key management server 140 or for decrypting communications received from the key management server 140. In an embodiment, the key management server 140 may encrypt a key management server 140 certificate (e.g., KMS certificate defined in 3GPP TS 33.180) associated with the key management server 140 using a symmetric transport key of the bootstrap information to generate an encrypted key management server certificate. In this embodiment, when the communications received from the key management server 140 include the encrypted key management server certificate, the client device 110 retrieves the key management server certificate by decrypting the encrypted key management server certificate with the symmetric transport key obtained from the key management server at block 440. In another embodiment, the key management server 140 may encrypt user-specific key material (e.g., user key material defined in 3GPP TS 33.180) using the symmetric transport key to generate an encrypted user-specific key material. In this embodiment, when the communications received from the key management server 140 includes the encrypted user-specific key material, the client device 110 retrieves the user-specific key material by decrypting the encrypted user-specific key material with the symmetric transport key obtained from the key management server 140 at block 440. In accordance with some embodiments, the client device 110 derives one or more user plane and control plane protection keys from the key management certificate and the user-specific key material. The user plane and control plane protection keys are used to respectively encrypt user plane data (e.g., user traffic data such as text, audio, video, floor control, receiver/sender reports, etc.) and control plane data (e.g., signaling traffic data associated with SIP signaling, HTTP web traffic, REST (representational state transfer) APIs (application program interfaces), etc.). The user plane and control plane protection keys include one or more of: user-key material for MIKEY-SAKKE (Sakai-Kasahara Key Encryption in Multimedia Internet KEYing) IBE (Identity-Based Encryption System); XPK (XML (extensible markup language) protection key); CSK (client-server key); PCK (private call key); GMK (group master key); and SPK (SIP (session initiation protocol) protection key).

Figure 5:
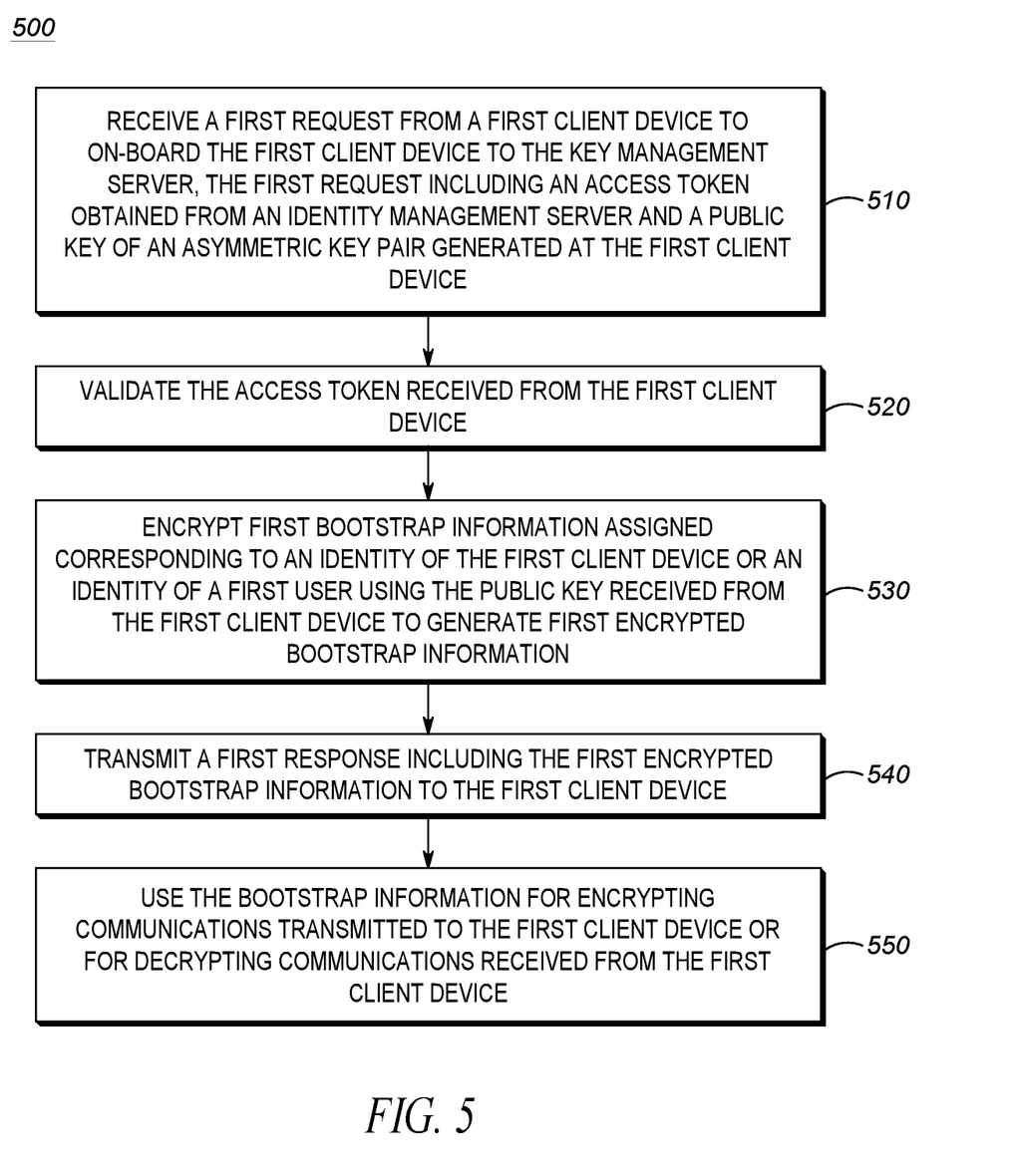
FIG. 5 illustrates a flow diagram of another process for onboarding client devices to a key management server in accordance with some embodiments.

Turning now to FIG. 5, a flowchart diagram illustrates a process 500 for onboarding client devices 110 to a key management server 140. While a particular order of processing steps, message receptions, and/or message transmissions is indicated in FIG. 5 as an example, timing and ordering of such steps, receptions, and transmissions may vary where appropriate without negating the purpose and advantages of the examples set forth in detail throughout the remainder of this disclosure. The process 500 of FIG. 4 is executed by the key management server 140 and need not be performed in the exact sequence as shown and likewise various blocks may be performed in different order or alternatively in parallel rather than in sequence. The process 500 may be implemented on variations of the communications system 100 of FIG. 1 as well.

At block 510, the key management server 140 receives a request from a client device, for example, a first client device 110-1 to onboard the first client device 110-1 to the key management server 140. The request includes an access token obtained by the first client device 110-1 after successfully authenticating with an identity management server 130. The request also further includes a public key of an asymmetric key pair generated at the first client device 110-1. In accordance with embodiments, the key management server 140 receives the access token in an application-level message transmitted from the first client device 110-1 via one or more transport-layer security proxy nodes (e.g., F5 proxy). In one embodiment, the access token and the public key are included in a single message associated with the request to onboard the first client device 110-1. In another embodiment, the key management server 140 may receive the access token and the public key in separate messages associated with the request to onboard the first client device 110-1. For example, the request including the access token may be received in the first message. The public key may be received in a separate second message, for example, after the key management server 140 transmits an acknowledgment indicating the validity of the access token.

At block 520, the key management server 140 validates the access token received from the first client device 110-1. The access token received from the key management server 140 corresponds to either an identity of the first client device 110-1 or an identity of a user operating the first client device 110-1. In one embodiment, after receiving the access token from the first client device 110-1, the key management server 140 communicates with the identity management server 130 to verify whether the access token received from the first client device 110-1 is valid. In another embodiment, the key management server 140 may locally maintain (e.g., at the memory 330) a list of validated access tokens obtained from the identity management server 130 corresponding to identities of client devices and users. In this embodiment, the key management device compares the received access token with attributes of the locally maintained access tokens. When there is a match between the attributes of the access tokens, the key management server 140 determines that the access token received from the first client device 110-1 is valid. In yet another embodiment, the key management server 140 may be provisioned with a set of trusted certificates belonging to the identity management server 130 in the trusted security domain(s) associated with the system. If the token is verified to be tamper proof and cryptographically signed by one of the trusted certificates belonging to an identity management server 130, the key management server 140 determines that the access token received from the first client device 110-1 is valid.

At block 530, the key management server 140 encrypts bootstrap information assigned corresponding to an identity of the first client device 110-1 or an identity of a user (e.g., a user operating the first client device 110-1) using the public key received from the first client device 110-1 to generate encrypted bootstrap information. The encrypted bootstrap information includes bootstrap information assigned corresponding to an identity of the first client device 110-1 or an identity of the user. As used herein, the term "bootstrap information" refers to an initial cryptographic seed or security context generated by the key management server 140 pursuant to establishing a trust relation with a previously unknown client device or user. In accordance with embodiments, the bootstrap information includes one or more of a transport key (e.g., 3GPP bootstrap transport key or TrK), a certificate, a hardware security token, a near-field communication (NFC) token, or a biometric key. The bootstrap information is further encrypted using the public key of the asymmetric key pair. The bootstrap information assigned corresponding to the identity of the first client device 110-1 may be different from the bootstrap information assigned corresponding to the identity of the user. For example, when the access token included in the request received from the first client device 110-1 corresponds to an identity of the first client device 110-1, the bootstrap information is assigned corresponding to the identity of the first client device 110-1. As another example, when the access token included in the request received from the first client device 110-1 corresponds to an identity of the user, the bootstrap information is assigned corresponding to the identity of the user. When multiple users operate the same client device, bootstrap information assigned corresponding to each of the respective identities of the users is different. In accordance with some embodiments, the key management server 140 generates bootstrap information in accordance with any one of algorithms defined in cryptographic standards used in 3GPP TS 33.180.

In one embodiment, the key management server 140 randomly generates and assigns new bootstrap information each time a request to onboard the client device 110 is received at the key management server 140. In this embodiment, any bootstrap information previously assigned corresponding to a particular identity (i.e., identity of the client device 110 or identity of the user) automatically expires upon the assignment of the new bootstrap information to the same identity. In another embodiment, the key management server 140 retrieves bootstrap information previously assigned corresponding to a particular identity (i.e., either identity of the client device 110 or the user) and re-encrypts the bootstrap information using the public key included in the recent request received from the client device 110. In this embodiment, when the bootstrap information previously assigned corresponding to the particular identity has already expired or when no bootstrap information has been previously assigned corresponding to the same identity, the key management server 140 generates and assigns new bootstrap information and further encrypts the bootstrap information using the public key included in the request received from the client device 110.

At block 540, the key management server 140 transmits a response including the encrypted bootstrap information to the first client device 110-1 via the communication network 150.

At block 550, the key management server 140 uses the bootstrap information for encrypting communications transmitted to the first client device 110-1 or for decrypting communications received from the first client device 110-1. For example, the key management server 140 may encrypt a key management server certificate (e.g., KMS certificate defined in 3GPP TS 33.180) associated with the key management server using a symmetric transport key of the bootstrap information to generate and transmit an encrypted key management server certificate to the first client. In this embodiment, when the communications received from the key management server 140 includes the encrypted key management server certificate, the first client device 110-1 retrieves the key management server certificate by decrypting the encrypted key management server certificate with the symmetric transport key obtained from the key management server 140. In another embodiment, the key management server 140 may encrypt user-specific key material (e.g., user key material defined in 3GPP TS 33.180) using the symmetric transport key to generate and transmit an encrypted user-specific key material to the first client device 110-1. In this embodiment, when the communications received from the key management server 140 includes the encrypted user-specific key material, the first client device 110-1 retrieves the user-specific key material by decrypting the encrypted user-specific key material with the symmetric transport key from the key management server 140 at block 450. In accordance with some embodiments, the first client device 110-1 derives one or more user plane and control plane protection keys from the key management server certificate and user-specific key material. For example, the user plane protection keys (e.g., XPK, CSK, PCK, GMK, SPK etc.) derived from the key management server certificate and user-specific key material are used to protect calls (e.g., mission critical call (MCCall)) and data (e.g., mission critical data (MCData) services such as short data service (SDS) and file distribution (FD)).

In accordance with some embodiments, the key management server 140 repeats this process 500 each time a request to onboard a client device 110 is received from the client device 110. For example, assume that a user operating the first client device 110-1 has switched to operating a different client device (e.g., a second client device 110-2). In this case, the user initiates an onboarding process to onboard the second client device 110-2 to the key management server 140. The key management server 140 receives a request from the second client device 110-2 to onboard the second client device 110-2 to the key management server 140. The request includes an access token (i.e., access token assigned corresponding to an identity of the user) obtained by the second client device 110-2 after successfully authenticating with the identity management server 130. The request further includes a public key (different from the public key previously generated at the first client device 110-1) of an asymmetric key pair generated at the second client device 110-2. The key management server 140 validates the access token received from the second client device 110-2. The key management server 140 determines that the access token is associated with an identity of a user for whom bootstrap information has been previously assigned. In one embodiment, since the bootstrap information has been previously assigned to the user, the key management server 140 encrypts the bootstrap information previously assigned to the user using the new public key received via the second client device 110-2 to generate encrypted bootstrap information. In another embodiment, the key management server generates new bootstrap information for the user (for operating the second client device 110-2) even if the user has been previously assigned bootstrap information on a different device (e.g., first client device 110-1). In any case, the key management server 140 transmits a response including the encrypted bootstrap information to the second client device 110-2. The key management server 140 then uses the bootstrap information for encrypting communications transmitted to the second client device 110-2 or for decrypting communications received from the second client device 110-2 for a duration of the user's session (e.g., call or data session) on the second client device 110-2.

In accordance with embodiments, a client device 110 may need to be onboarded again each time a new user logs into the client device 110. For example, assume that the first client device 110-1 is now operated by a new user. In this case, before the new user can avail the services offered by the telecommunications platform 120 via the first client device 110-2, the new user needs to onboard the first client device 110-2 again to the key management server 140. The key management server 140 accordingly receives a request from the first client device 110-1 to onboard the first client device 110-1 to the key management server 140. The request includes an access token obtained by the first client device 110-1 after successfully authenticating an identity of the new user with the identity management server 130. The request further includes a public key of an asymmetric key pair generated at the first client device 110-1. In accordance with some embodiments, the first client device 110-1 may generate a new asymmetric key pair each time a new user requests to onboard the first client device 110-1 to the key management server 140. In other embodiments, the first client device 110-1 may generate an asymmetric key pair once and may re-use the asymmetric key pair (as long as the key pair has not expired) for onboarding purposes even if a first client device 110-1 is being onboarded for a new user. In any case, the public key of the asymmetric key pair is included in the request sent to the key management server 140. The key management server 140 validates the access token received from the first client device 110-1. The key management server 140 determines that the access token is associated with an identity of a user for whom bootstrap information has not been previously assigned. In one embodiment, since the bootstrap information has not been previously assigned to the user, the key management server 140 randomly generates and assigns new bootstrap information corresponding to the identity of the new user. The key management server 140 then encrypts the new bootstrap information assigned corresponding to the identity of the new user using the public key received from the first client device 110-1 to generate encrypted bootstrap information. The key management server 140 transmits a response including the encrypted bootstrap information to the first client device 110-1. The key management server 140 then uses the bootstrap information for encrypting communications transmitted to the first client device 110-1 or for decrypting communications received from the first client device 110-1 for a duration of the new user's session (e.g., call or data session) on the first client device 110-1. In accordance with some embodiments, even after receiving the encrypted bootstrap information for the new user, the first client device 110-1 retains bootstrap information assigned to previous users until the bootstrap information expires, the users are logged out, the users are no longer authenticated, or based on other policies.

Embodiments described herein can be advantageously implemented in 3GPP communication systems deployed for providing secure mission critical communication services. Embodiments described herein allow client devices to be onboarded to a key management infrastructure without requiring staging the client devices using a key delivery device. Embodiments described herein allow a user to be authenticated to the key management infrastructure using native authentication methods and to obtain initial bootstrap information which is encrypted using the given client device's public key. Encrypting bootstrap information using the client's public key allows secure over-the-air transmission of bootstrap information even in the presence of one or more untrusted network elements in the transmission path of the bootstrap information. Embodiments described herein also ensure that encrypted bootstrap information such as 3GPP transport key is decrypted and made available in clear or in other words in a decrypted form only within a protected environment (e.g., a hardware security module or protected key store) of the client device for running cryptographic operations such as encryption, decryption, signing, and verification.

As should be apparent from this detailed description, the operations and functions of the computing devices described herein are sufficiently complex as to require their implementation on a computer system, and cannot be performed, as a practical matter, in the human mind. Electronic computing devices such as set forth herein are understood as requiring and providing speed and accuracy and complexity management that are not obtainable by human mental steps, in addition to the inherently digital nature of such operations (e.g., a human mind cannot interface directly with RAM or other digital storage, cannot transmit or receive electronic messages, electronically encoded video, electronically encoded audio, etc., among other features and functions set forth herein).

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings. The benefits, advantages, solutions to problems, and any element(s) that may cause any benefit, advantage, or solution to occur or become more pronounced are not to be construed as a critical, required, or essential features or elements of any or all the claims. The disclosure is defined solely by the appended claims including any amendments made during the pendency of this application and all equivalents of those claims as issued.

Moreover, in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element preceded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "one of", without a more limiting modifier such as "only one of", and when applied herein to two or more subsequently defined options such as "one of A and B" should be construed to mean an existence of any one of the options in the list alone (e.g., A alone or B alone) or any combination of two or more of the options in the list (e.g., A and B together).

A device or structure that is "configured" in a certain way is configured in at least that way, but may also be configured in ways that are not listed.

The terms "coupled", "coupling" or "connected" as used herein can have several different meanings depending on the context in which these terms are used. For example, the terms coupled, coupling, or connected can have a mechanical or electrical connotation. For example, as used herein, the terms coupled, coupling, or connected can indicate that two elements or devices are directly connected to one another or connected to one another through an intermediate elements or devices via an electrical element, electrical signal or a mechanical element depending on the particular context.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Any suitable computer-usable or computer readable medium may be utilized. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. In the context of this document, a computer-usable or computer-readable medium may be any medium that can contain, store, communicate, propagate, or transport the program for use by or in connection with the instruction execution system, apparatus, or device.

Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation. For example, computer program code for carrying out operations of various example embodiments may be written in an object oriented programming language such as Java, Smalltalk, C++, Python, or the like. However, the computer program code for carrying out operations of various example embodiments may also be written in conventional procedural programming languages, such as the "C" programming language or similar programming languages. The program code may execute entirely on a computer, partly on the computer, as a stand-alone software package, partly on the computer and partly on a remote computer or server or entirely on the remote computer or server. In the latter scenario, the remote computer or server may be connected to the computer through a local area network (LAN) or a wide area network (WAN), or the connection may be made to an external computer (for example, through the Internet using an Internet Service Provider).

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A method of onboarding client devices to a key management server, the method comprising:
   generating, at a client device, an asymmetric key pair including a public key and a private key;
   obtaining, at the client device, an access token from an identity management server after successfully authenticating the client device or a user with the identity management server;
   transmitting, at the client device, a request to the key management server to onboard the client device to the key management server, the request including the access token and the public key of the asymmetric key pair;
   receiving, at the client device, a response including encrypted bootstrap information from the key management server, the encrypted bootstrap information including bootstrap information assigned corresponding to an identity of the client device or an identity of the user, the bootstrap information encrypted using the public key of the asymmetric key pair;
   decrypting, at the client device, the encrypted bootstrap information using the private key of the asymmetric key pair to obtain the bootstrap information; and
   using, at the client device, the bootstrap information for encrypting communications transmitted to the key management server or for decrypting communications received from the key management server.

2. The method of claim 1, further comprising:
   storing, at the client device, the bootstrap information in a secure storage container associated with the client device, wherein the bootstrap information is available in a decrypted form only within the secure storage container of the client device.

3. The method of claim 2, wherein the secure storage container is one of a hardware security module (HSM) or a protected key store.

4. The method of claim 2, wherein the public key of the asymmetric key pair is generated and stored in the secure storage container.

5. The method of claim 1, wherein the access token and the public key are included in a single message associated with the request to onboard the client device.

6. The method of claim 1, wherein the access token and the public key are included in separate messages associated with the request to onboard the client device.

7. The method of claim 1, wherein the bootstrap information includes one or more of a transport key, a certificate, a hardware security token, a near-field communication (NFC) token, or a biometric key.

8. The method of claim 1, wherein the bootstrap information includes a symmetric transport key and the communications received from the key management server include an encrypted key management server certificate associated with the key management server, the key management server certificate encrypted using the symmetric transport key, wherein decrypting comprises:

decrypting, at the client device, the encrypted key management server certificate using the symmetric transport key.

9. The method of claim 8, wherein the communications received from the key management server further include an encrypted user-specific key material, the user-specific key material encrypted using the symmetric transport key, wherein decrypting comprises:
decrypting, at the client device, the encrypted user-specific key material using the symmetric transport key.

10. The method of claim 9, further comprising:
deriving, at the client device, one or more user plane and control plane protection keys using the key management server certificate and user-specific key material.

11. The method of claim 10, wherein the user plane and control plane protection keys are selected from the group consisting of: user-key material associated with MIKEY-SAKKE (Sakai-Kasahara Key Encryption in Multimedia Internet KEYing) IBE (Identity-Based Encryption System), XPK (XML (extensible markup language) protection key), CSK (client-server key), PCK (private call key), GMK (group master key), and SPK (SIP protection key).

12. The method of claim 1, wherein the access token is included in an application-level message transmitted to the key management server via one or more transport-layer security proxy nodes.

13. A method of onboarding client devices to a key management server, the method comprising:
receiving, at the key management server, a first request from a first client device to onboard the first client device to the key management server, the first request including an access token obtained by the first client device after successfully authenticating with an identity management server, the first request further including a public key of an asymmetric key pair generated at the first client device;
validating, at the key management server, the access token received from the first client device;
encrypting, at the key management server, first bootstrap information assigned corresponding to an identity of the first client device or an identity of a first user using the public key received from the first client device to generate first encrypted bootstrap information;
transmitting, at the key management server, a first response including the first encrypted bootstrap information to the first client device; and
using, at the key management server, the bootstrap information for encrypting communications transmitted to the first client device or for decrypting communications received from the first client device.

14. The method of claim 13, further comprising:
determining that the access token is associated with the identity of the first user;
assigning new bootstrap information corresponding to the identity of the first user when no bootstrap information has been previously assigned corresponding to the identity of the first user or when bootstrap information previously assigned to the first user has expired; and
wherein encrypting first bootstrap information comprises encrypting the new bootstrap information assigned corresponding to the identity of the first user using the public key received from the client device to generate the first encrypted bootstrap information.

15. The method of claim 14, wherein the bootstrap information includes a symmetric transport key and the communications transmitted to the first client device include a key management server certificate associated with the key management server, the key management server certificate encrypted using the symmetric transport key and a user-specific key material encrypted using the symmetric transport key.

16. The method of claim 13, further comprising:
receiving a second request from a second client device to onboard the second client device to the key management server, the request including a second access token obtained by the second client device after successfully authenticating with the identity management server, the request further including a second public key of a second asymmetric key pair generated at the second client device;
validating, at the key management server, the access token received from the second client device;
determining that the access token is associated with the identity of the first user;
encrypting, at the key management server, the first bootstrap information assigned corresponding to the identity of the first user using the second public key received from the client device to generate second encrypted bootstrap information;
transmitting, at the key management server, a second response including the second encrypted bootstrap information to the second client device; and
using, at the key management server, the bootstrap information for encrypting communications transmitted to the second client device or for decrypting communications received from the second client device for a duration of first user's session on the second client device.

17. The method of claim 13, further comprising:
receiving a third request from the first client device to onboard the first client device to the key management server, the request including a third access token obtained by the first client device after successfully authenticating with the identity management server, the request further including a third public key of a third asymmetric key pair generated at the first client device;
validating, at the key management server, the third access token received from the first client device;
determining that the access token is associated with an identity of a second user;
encrypting, at the key management server, third bootstrap information assigned corresponding to the identity of the second user using the third public key received from the first client device to generate third encrypted bootstrap information;
transmitting, at the key management server, a third response including the third encrypted bootstrap information to the first client device; and
using, at the key management server, the third bootstrap information for encrypting communications transmitted to the first client device or for decrypting communications received from the first client device for a duration of second user's session on the first client device.

18. A communication system, comprising:
a client device;
a key management server; and
a communication network configured to establish communication between the client device and the key management server,
the client device is configured to generate an asymmetric key pair including a public key and a private key, obtain an access token from an identity management server after successfully authenticating the client device or a user with the identity management server, and transmit a request to the key management server to onboard the client device to the key management server, the request including the access token and the public key of the asymmetric key pair, the key management server is configured to validate the access token included in the request received from the client device, encrypt bootstrap information assigned corresponding to an identity of the client device or an identity of a first user using the public key received from the client device to generate encrypted bootstrap information, and transmit a response including the encrypted bootstrap information to the client device, and the client device is further configured to receive the response from the key management server, decrypt the encrypted bootstrap information using the private key of the asymmetric key pair to obtain the bootstrap information, and use the bootstrap information for encrypting communications transmitted to the key management server or for decrypting communications received from the key management server.

19. The communication system of claim 18, wherein the client device includes a secure storage container for storing the bootstrap information, wherein the bootstrap information is available in a decrypted form only within the secure storage container of the client device.

20. The communication system of claim 19, wherein the bootstrap information includes a symmetric transport key and communications received from the key management server include a key management server certificate associated with the key management server and a user-specific key material, wherein the key management server certificate and the user-specific key material are each encrypted by the key management server using the symmetric transport key.

* * * * *